United States Patent
Weissman et al.

(10) Patent No.: US 10,915,408 B2
(45) Date of Patent: Feb. 9, 2021

(54) SNAPSHOT FOR GROUPING AND ELASTIC REPLICATION OF VIRTUAL MACHINES

(71) Applicant: Datrium Inc., Sunnyvale, CA (US)

(72) Inventors: Boris Weissman, Palo Alto, CA (US); Sazzala Reddy, Los Altos, CA (US); R. Hugo Patterson, III, Los Altos, CA (US)

(73) Assignee: VMware, Inc., Palo Alto, CA (US)

( * ) Notice: Subject to any disclaimer, the term of this patent is extended or adjusted under 35 U.S.C. 154(b) by 298 days.

(21) Appl. No.: 15/960,841

(22) Filed: Apr. 24, 2018

(65) Prior Publication Data

US 2019/0324865 A1 Oct. 24, 2019

Related U.S. Application Data

(63) Continuation-in-part of application No. 15/956,283, filed on Apr. 18, 2018.

(51) Int. Cl.
*G06F 9/455* (2018.01)
*G06F 11/14* (2006.01)
*H04L 12/24* (2006.01)

(52) U.S. Cl.
CPC ...... *G06F 11/1464* (2013.01); *G06F 9/45558* (2013.01); *G06F 11/1461* (2013.01); *G06F 11/1469* (2013.01); *H04L 41/0893* (2013.01); *G06F 2009/45562* (2013.01); *G06F 2009/45595* (2013.01); *G06F 2201/84* (2013.01)

(58) Field of Classification Search
CPC ............ G06F 11/1464; G06F 9/45558; G06F 11/1461; G06F 11/1469; G06F 2009/45562; G06F 2009/45595; G06F 2201/84; H04L 41/0893
See application file for complete search history.

(56) References Cited

U.S. PATENT DOCUMENTS

| | | | |
|---|---|---|---|
| 9,237,087 B1 * | 1/2016 | Risbood | H04L 45/00 |
| 10,484,297 B1 * | 11/2019 | McClenahan | H04L 41/0813 |
| 2010/0070978 A1 * | 3/2010 | Chawla | G06F 9/5077 718/105 |
| 2011/0225277 A1 * | 9/2011 | Freimuth | G06F 9/45558 709/223 |

* cited by examiner

*Primary Examiner* — Wissam Rashid
(74) *Attorney, Agent, or Firm* — Fish & Richardson P.C.

(57) ABSTRACT

Techniques for scheduling replication events may be based upon establishing a plurality of policy groups. Each policy group has a replication schedule that defines when to initiate replication events and a membership selection pattern used to determine which virtual machines belong to which policy group. The policy groups may contain a first policy group and a second policy group, where each policy group has a unique replication schedule and a unique selection pattern. The system may assign a first set of virtual machines to the first policy group based upon the first selection pattern. A second set of virtual machines may be assigned to a second policy group based upon the second selection pattern. Each of the virtual machines in the first policy group may be assigned a first replication schedule and each of the virtual machines in the second policy group may be assigned a second replication schedule.

18 Claims, 5 Drawing Sheets

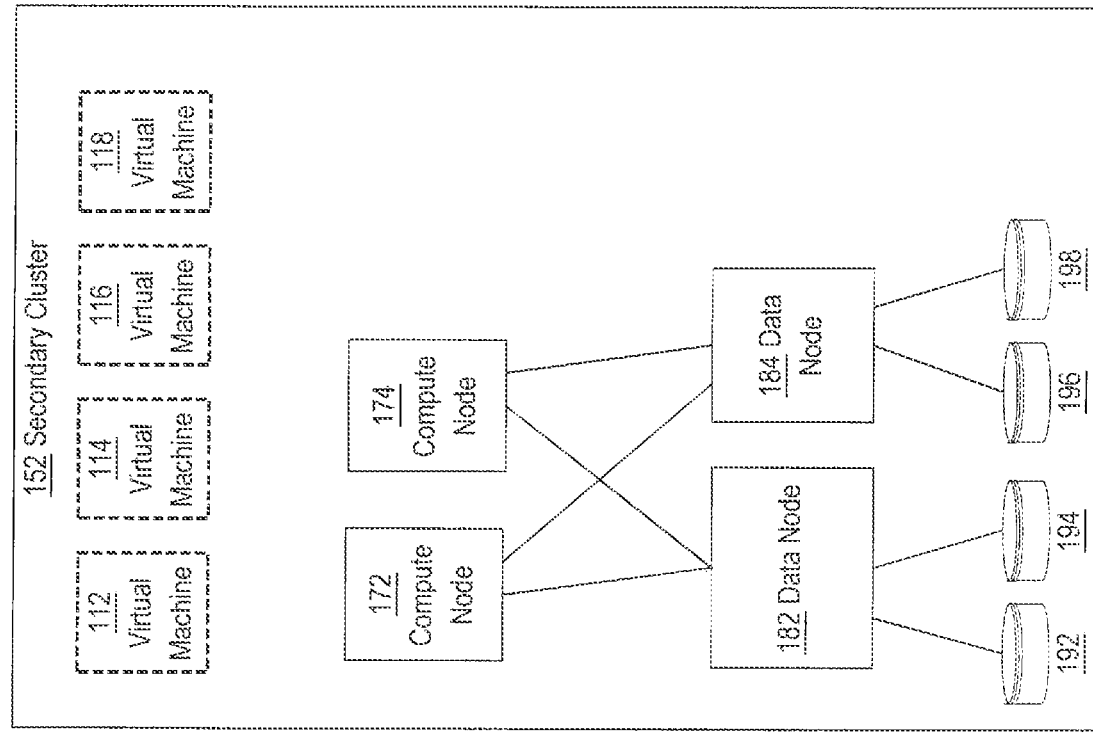
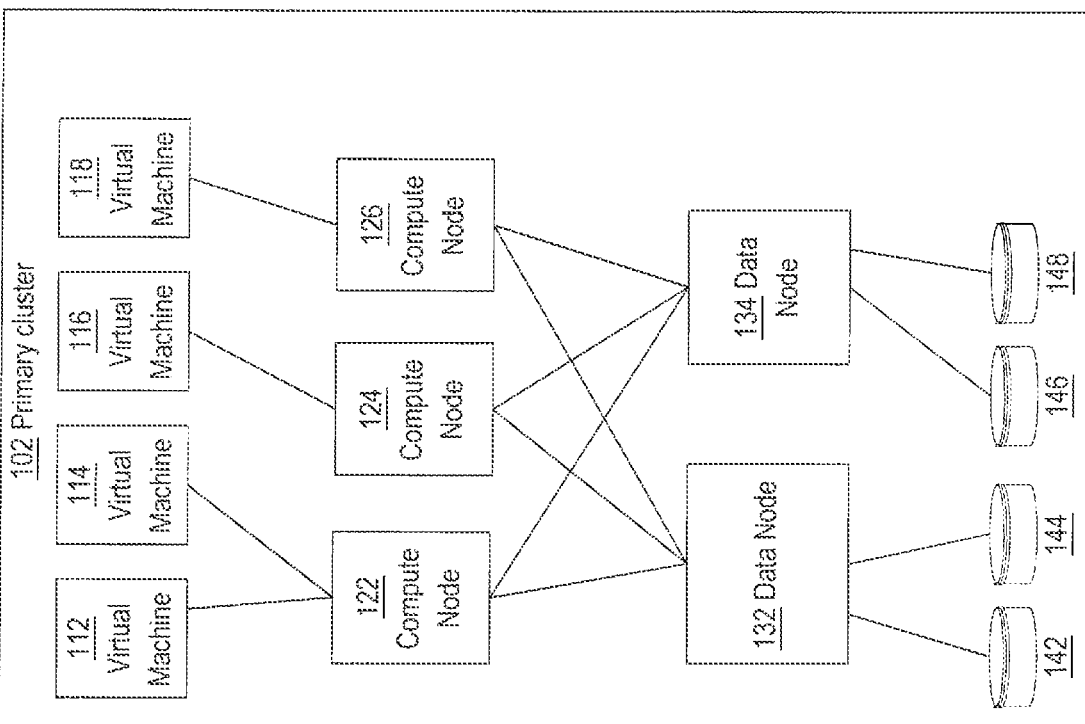
FIG. 1

US 10,915,408 B2

SNAPSHOT FOR GROUPING AND ELASTIC REPLICATION OF VIRTUAL MACHINES

CROSS-REFERENCE TO RELATED APPLICATIONS

This application is a Continuation-in-Part of and claims priority of U.S. patent application Ser. No. 15/956,283, filed 18 Apr. 2018, the contents of which are incorporated by reference.

FIELD OF THE INVENTION

The present invention relates to replicating virtual machine data from a primary cluster to a secondary cluster.

BACKGROUND

The ability to replicate data from one site to another is critical towards achieving disaster recovery and business continuity. Performing replication, however, requires a sizeable investment in computing resources and operating expense, because such replication may require maintaining multiple systems while imposing additional configuration, networking, and performance overheads.

In traditional storage arrays, an active array controller typically handles replication tasks. As a result, the active array controller may become a central bottleneck because it is not only tasked with performing replications, but also handling I/O operations within the environment. As a result, a degradation in performance may occur in performance related to replication tasks and I/O operations. Additionally, the active array controller replicates data at a physical volume (LUN) level, where entire volumes are replicated, including all VMs and virtual disks contained within the physical volume. Consequently, scheduled replications to another site may include replicating the entire physical volume each time even though only a fraction of the volume may have changed. By replicating entire physical volumes, sites may require more total capacity at both the source and destination as they replicate more data than necessary.

Hyper-converged systems are a software-defined infrastructure that virtualizes elements of a system such that storage components, application components, and networking components are virtualized and configured to suit the needs of the system. Hyper-converged systems may be configured to allow replication granularity at a per-virtual machine level, allowing specific virtual machines to be replicated while others are not. However, managing replication schedules for hundreds or even thousands of individual virtual machines requires significant configuration resources and overhead.

Therefore, a method and system is needed for determining efficient replication at a level of granularity that reduces unnecessary replication of static data and prevents undue performance bottlenecks.

BRIEF DESCRIPTION OF THE DRAWINGS

In the drawings:

FIG. 1 depicts a sample embodiment of a distributed storage system including two storage clusters.

DETAILED DESCRIPTION

Figure 2:
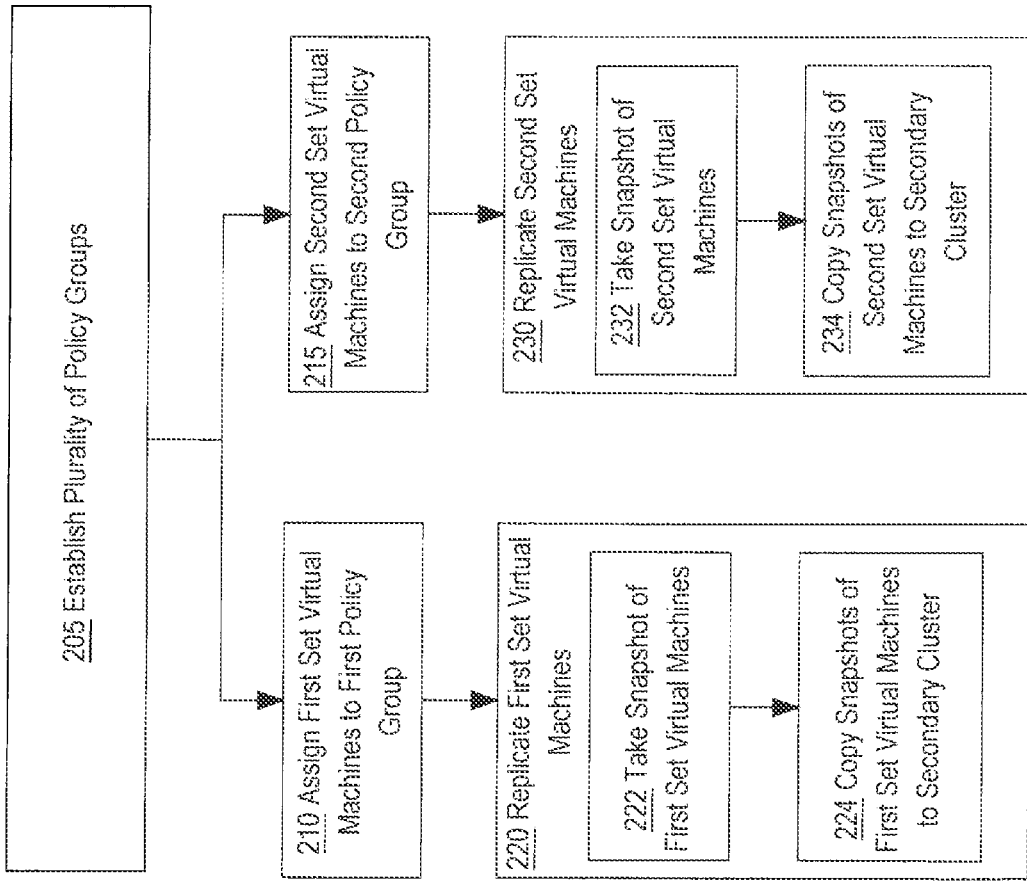
FIG. 2 depicts a sample flowchart for establishing multiple policy groups for virtual machines, assigning the virtual machines to different policy groups, and performing replication steps for each virtual machine within each policy group.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for replicating virtual machine data from a primary cluster of nodes to a secondary cluster of nodes. According to one embodiment, a plurality of compute nodes running on a primary cluster are configured to each determine the amount of virtual machine data cached within each compute node. A particular compute node is then selected to replicate the data of a particular virtual machine based on the amount of particular virtual machine data cached on that particular compute node. The particular compute node then copies the particular virtual machine data to a secondary cluster.

The amount of virtual machine data that is copied from the particular virtual machine to the secondary cluster is based on updated virtual machine data that belongs to a particular state of the virtual machine. The destination of the virtual machine data is based upon determining a target compute node within the secondary cluster, based upon the prior replication statistics.

In an embodiment, scheduling replication events may be based upon establishing a plurality of policy groups. Each policy group has a replication schedule that defines when to trigger a replication event and a membership selection pattern that is used to determine which virtual machines belong to which policy group. The membership selection pattern may include name-based criteria, attribute-based criteria, or both. Name-based criteria and attribute-based criteria shall be described in greater detail hereafter.

The plurality of policy groups may contain multiple policy groups including a first policy group and a second policy group, where each policy group has a unique replication schedule and a unique selection pattern. The system may assign a first set of virtual machines to the first policy group based upon a first property of the virtual machines and the first selection pattern. A second set of virtual machines may be assigned to a second policy group based upon a second property and a second selection pattern. By virtue of having the first property and satisfying the first selection pattern, a first replication schedule may apply to each of the virtual machines in the first policy group. By virtue of having the second property and satisfying the second selection pattern, a second replication schedule may apply to each of the virtual machines in the second policy group.

Structural Overview

A distributed storage system is made up of one or more storage clusters which may each contain a set of compute nodes configured to run and manage multiple virtual machines, and a set of data nodes configured to store virtual machine data. FIG. 1 depicts a sample embodiment of a distributed storage system including two storage clusters. Primary cluster 102 and secondary cluster 152 are storage clusters containing multiple compute nodes and multiple data nodes. Primary cluster 102 is configured as the active cluster of the distributed storage system and contains compute nodes running one or more virtual machines. The secondary cluster 152 is configured as a backup cluster to the primary cluster 102. The secondary cluster 152 contains compute nodes and data nodes that contain copies of virtual machine data from the primary cluster 102. If the distributed storage system fails over from the primary cluster 102 to the secondary cluster 152, the compute nodes within the secondary cluster 152 may start up and run instances of the one or more virtual machines.

While compute nodes within the primary cluster 102 and the secondary cluster 152 may have the same functionality, for the purpose of differentiating compute nodes on the primary cluster 102 and the secondary cluster 152, the compute nodes in the primary cluster 102 are referred to herein as "compute nodes" 122-126, and the compute nodes in the secondary cluster 152 are referred to herein as "target compute nodes" 172 and 174. Compute nodes 122-126 and target compute nodes 172 and 174 are servers configured to execute virtual machine instances, cache data from one or more virtual machines within internal storage, send and receive data from one or more data nodes, generate snapshot backups of virtual machine data, replicate snapshot backups to another cluster, and execute scheduling processes configured to schedule the snapshot backups of virtual machine data and schedule the replication of the snapshot backups to another cluster. As depicted in FIG. 1, compute nodes 122-126 are configured to generate snapshot backups and replicate the snapshot backups to the secondary cluster 152. Target compute nodes 172 and 174 are configured to receive and store the snapshot backups from the other compute nodes 122-126.

In an embodiment, each of compute nodes 122-126 and target compute nodes 172 and 174 contains one or more processors configured to manage the virtual machine and IO processing required to run each of the virtual machines and to schedule and maintain backups of virtual machine data. The compute nodes 122-126 and target compute nodes 172 and 172 contain a local cache implemented on a flash memory storage medium that is configured to maintain copies of virtual machine data. The compute nodes 122-126 and target compute nodes 172 and 172 are also configured with network devices and communication protocols that enable communication between other compute nodes, and data nodes within primary cluster 102 and secondary cluster 104. In other embodiments, compute nodes 122-126 and target compute nodes 174 and 172 may implement local caches on various other types of storage mediums.

In an embodiment, virtual machines 112, 114, 116, and 118 represent implementations of virtual computer environments including, but not limited to, system virtual machines that provide functionality for executing entire operating systems and process virtual machines that are configured to execute computer programs in a specific platform or a platform-independent environment. Virtual machines 112-118 run on at least one of compute nodes 122-126 or target compute nodes 172 and 174, which provide the hardware resources, such as CPU and memory, to run implementations of the virtual machines 112-118. In secondary cluster 152, virtual machines 112-118 are depicted with a dotted lined border. This depiction of virtual machines 112-118 represents that virtual machines 112-118 are not currently running within the secondary cluster 152 but have the potential to run within the secondary cluster 152 if the secondary cluster 152 becomes the active cluster.

In an embodiment, data nodes 132, 134, 182, and 184 represent storage servers configured to maintain persistent copies of virtual machine data and configured to communicate with compute nodes 122-126, target compute nodes 172 and 174, and storage devices 142, 144, 146, 148, 192, 194, 196, and 198. While data nodes 132-184 store compressed and de-duplicated data, compression and deduplication tasks are performed on the compute nodes. In an embodiment, storage devices 142, 144, 146, 148, 192, 194, 196, and 198 may represent storage devices configured with different types of storage mediums to persistently store virtual machine data.

Snapshots

In an embodiment, replication of virtual machine data from compute nodes and data nodes on the primary cluster 102 to the secondary cluster 152 includes generating snapshot data of virtual machines running on compute nodes 122-126 and then replicating the snapshot data from the compute nodes 122-126 to the secondary cluster 152. Virtual machine snapshots may provide a point-in-time representation of the state of virtual disks and configuration of a virtual machine at a specific point in time. A virtual machine snapshot may be used to recreate the virtual machine and the state of virtual machine environment as it were at the specific point in time when the snapshot was performed. In an embodiment, virtual machine snapshots include one or more files that describe the state of the virtual machine environment.

In an embodiment, compute nodes 122-126 perform snapshots on virtual machines 112-118. Specifically, snapshots are executed on virtual machines based upon which virtual machine is running on which compute node. For example, referring to FIG. 1 compute node 122 is running virtual machines 112 and 114 and therefore may generate snapshots of virtual machines 112 and 114. Compute nodes 124 and 126 may each generate snapshots of virtual machines 116 and 118 respectively. Generating a snapshot involves draining all data and meta-data to the data nodes and recording a snapshot meta-data pointer. The snapshot data is already stored on data nodes and cached on compute nodes when snapshot is created. In an embodiment, each of compute nodes 122-126 may send copies of the snapshots to data nodes 132 and 143 for persistent storage of snapshot data.

Snapshots of virtual machines provide a way to restore virtual machines to a state at a particular point in time. In an embodiment, compute nodes 122-126 are configured to coordinate and schedule point-in-time snapshots of multiple virtual machines such that the state of multiple virtual machines at a particular point in time may be preserved. For example, if virtual machines 112, 114, and 118 belong to a specific group of virtual machines that need to be backed up every hour, then compute nodes 122 and 126 are configured to generate snapshots of virtual machines 112, 114, and 118 at scheduled point in time such that the state of each of virtual machines 112, 114, and 118 at the scheduled point in time is preserved.

In an embodiment, scheduling a point-in-time snapshot across multiple virtual machines may be based upon establishing a point-in-time bookmark describing the time at which a snapshot is to be generated on the state of data for each of the virtual machines of interest. Each of compute nodes 122-126 provide the resources to run the virtual machines within primary cluster 102. For example, the local cache within each of compute nodes 122-126 contains data describing the current state of virtual disks and configuration settings for each of the virtual machines 112-118. Therefore when generating snapshots, compute nodes 122-126 first establish a point-in-time bookmark for the virtual machines of interest by identifying data within the local flash cache that is to be part of the new snapshot.

In an embodiment, cache within each of compute nodes 122-126 are configured to contain data of storing the current and past state of virtual machines running on compute nodes 122-126. For example, cache in compute node 122 may contain data that store state information including, but not limited to, state of virtual disks and configuration settings of virtual machines 112 and 114. Additionally, cache in compute node 122 may also contain information related to other virtual machines that may be been previously instantiated on compute node 122. The type and amount of data within cache of a particular compute node may be based upon the current state of the virtual machines running in the compute nodes.

Policy Groups

In an embodiment, virtual machines may be grouped into sets for the purpose of managing snapshot generation and replication snapshots to the secondary cluster 152 based on unique properties and configured schedules for each of the sets of virtual machines. For example, a set of virtual machines may be identified as virtual machines that support a market research group or application, while another set of virtual machines may be identified as virtual machines that support long-term recordkeeping. A system administrator of the primary cluster 102 and the secondary cluster 152 may desire that all market research virtual machines are required to be backed up every hour, whereas all recordkeeping virtual machines are required to be backed up every 12 hours. In this example, a policy group process may be configured to identify and assign virtual machines to particular policy groups based upon data and metadata from each virtual machine. Each policy group may then be configured to contain a unique replication schedule that defines when each virtual machine of the policy group is to be replicated to the secondary cluster 152. In an embodiment, the policy group process is a computer program that may be implemented to run on any one of the compute nodes 122-126 or data nodes 132, 134.

FIG. 2 depicts a sample flowchart for establishing multiple policy groups for virtual machines, assigning the virtual machines to different policy groups, and performing replication steps for each virtual machine within each policy group. At block 205, a policy group process generates a set of policy groups that are used to group different virtual machines together based upon the desired replication schedule for each policy group. In an embodiment, policy group process generates multiple policy groups. Each of the policy groups may contain a specific replication schedule that defines when to replicate each of the member virtual machines to the secondary cluster 152 and a membership selection pattern that defines how to identify specific virtual machines that belong to each policy group.

For example, the set of policy groups may contain two different policy groups: a market research policy group and a recordkeeping policy group. The market research policy group may be defined as a set of virtual machines related to the market research department. For instance, the market research policy group may include virtual machines that are used by members of the market research team and other virtual machines that run market research related servers and applications. The recordkeeping policy group may be defined as a set of virtual machines including machines used by the recordkeeping group and applications that support the recordkeeping group.

Policy groups for a set of virtual machines are not limited to virtual machine files. In an embodiment, policy groups may be applied to other group specific objects or files stored within compute nodes, data nodes, and storage devices within the primary cluster 102. For example, the market research policy group may also apply to specific disk images (ISOs), specific virtual applications stored as an open virtualized format (OVF), or any other specific file used in conjunction with or to generate virtual machines that are part of a particular policy group.

Membership Selection Patterns Using Name-Based Criteria

In an embodiment, each policy group may contain a specific membership selection pattern that is used to identify specific virtual machines, based upon a naming convention of the set of all virtual machines in primary cluster 102 that belong to a specific policy group. As mentioned above, the member selection patterns may include name-based criteria, attribute-based criteria, or both. Name-based criteria establishes group membership based on the names of the respective virtual machines. For example, the membership selection pattern for policy group market research may implement pattern matching to match "mkt-res" in the name of available virtual machines. This pattern matching may be useful to match each virtual machine in the market research group that has the keyword "mkt-res" in its name. By doing so, additional market research virtual machines may be created and dynamically added to the market research policy group by including "mkt-res" within the name of the virtual machine. In other embodiments, the membership selection pattern may specify different types of alpha-numeric pattern matching algorithms to identify desired virtual machines.

Membership Selection Patterns Using Attribute-Based Criteria

Attribute-based criteria establishes policy group membership based on metadata associated with VMs other than the name of the VMs. For example, in an embodiment, policy group membership may be based on an explicit enumeration of virtual machines to include within a policy group. For example, virtual machines numbered "001" through "099" may be included in the MKT policy group.

In an embodiment, policy group membership may be based on tags assigned to a virtual machine by a virtual machine management system. For example, virtual machines tagged as "macOS®" or "Microsoft® Windows®" operating systems may be included in the OS policy group.

In an embodiment, policy group membership may be based on a security group to which a virtual machine belongs. Security policies, including traffic filtering and port assignments, may be assigned to virtual machines belonging to a particular security policy group.

Other embodiments of the membership selection pattern may specify other different types of metadata specific to virtual machines in order to belong to a specific policy group. For example, membership selection patterns may specify combinations of unique metadata properties in order to identify specific virtual machines that belong to specific policy groups. A non-limiting set of these metadata properties may include one or more of the following:

- ownership of a virtual machine,
- host-cluster that a virtual machine is assigned or registered to,
- data change rate of a virtual machine,
- size of a virtual machine,
- number or character of virtual disks attached to a virtual machine,
- file-system type used to format one or more disks associated with a virtual machine, for e.g., NTFS, FAT, EXT4, XFS, etc.,
- presence of specific software applications residing in the virtual machine, for example SQL Server™, Exchange™, Oracle™, etc.,
- presence of specific software residing in the virtual machine, such as Datrium Hardware Provider™ for Microsoft Volume Shadow Copy Service™ (VSS),
- IP address or subnet that a virtual machine's network is configured to have or be part of,
- a name of a virtual machine referenced within the Domain Name System for the network address associated with the virtual machine.

In other embodiments of membership selection, non-membership of a VM or object in one, a set, or any other policy group could be part of the selection pattern. Lacking a particular attribute could also be part of the selection pattern.

In other embodiments, policy groups may be created automatically for a set of virtual machines. This involves examining metadata properties associated with each virtual machine in the set of virtual machines in order to discover common metadata properties. Relationships involving one or more of common metadata properties may be used to specify policy groups with specified policy membership selection patterns. For example, a membership selection pattern may be specified as involving all virtual machines in the set satisfying the specified relationship: <TAG= "Windows", MEMORY<=16 GiB>. Policy groups can then be created based on the specified policy membership selection patterns and virtual machines may then be assigned to the each of the policy groups based on their satisfying the corresponding membership selection policy group.

In some embodiments, the policy group discovery process may be performed by applying clique detection approaches in graph theory or other algorithms to the virtual machine attributes in order to identify commonly grouped metadata properties of virtual machines. As noted in the above example, the attributes listed above may be used singly or in specified combinations to find useful groups of virtual machines, vdisks, files, or directories to manage with a common policy.

Policy Group Example

Referring back to FIG. 2 at block 205 the policy group process generates and maintains multiple policy groups. In addition to the membership selection pattern for each policy group, the policy group process also maintains a replication schedule for each policy group. In an embodiment, the replication schedule includes a snapshot-generation schedule defining when to generate consistent snapshots for virtual machines within a policy group and a snapshot-copy schedule defining when to replicate the generated snapshots from the primary cluster 102 to the secondary cluster 152.

At block 210, the policy group process assigns a first set of virtual machines to the first policy group based upon a first membership selection pattern associated with the first policy group. If the first policy group is the market research group and the first membership selection pattern is "mkt-res" for virtual machine names, then the policy group process identifies all virtual machines running within the primary cluster 102 that have a virtual machine name that matches the first membership selection pattern "mkt-res." For example, if the virtual machines running on the primary cluster 102 are:

- virtual machine 112, name="VM-112-mkt-res"
- virtual machine 114, name="VM-114-mkt-res"
- virtual machine 116, name="VM-116-rec-kp"
- virtual machine 118, name="VM-118-mkt-res"

then for policy group market research, the policy group process identifies virtual machines 112, 114, and 118 as matching the first membership selection pattern. The policy group process then assigns virtual machines 112, 114, and 118 to the first policy group based upon the first membership selection pattern "mkt-res."

At block 215, the policy group process assigns a second set of virtual machines to the second policy group based upon a second membership selection pattern associated with the second policy group. If the second policy group is the recordkeeping group and the second membership selection pattern is "rec-kp" for virtual machine names, then the policy group process identifies all virtual machines running within the primary cluster 102 that have a virtual machine name that matches the second membership selection pattern "rec-kp." As in the previous example, the policy group process identifies virtual machine 116 as matching the second membership selection pattern. The policy group process then assigns virtual machine 116 to the second policy group based upon the second membership selection pattern "rec-kp."

In an embodiment, a specific virtual machine may belong to two or more policy groups if the membership selection pattern identifies the specific virtual machine as part of two or more policy groups. For example, if the specific virtual machine name is "VM-900-mkt-res-and-rec-kp" then at both blocks 210 and 215 the policy group process would identify the specific virtual machine as belonging to both policy groups: market research and recordkeeping. In this scenario, replication schedules for both the market research policy group and the recordkeeping policy group would be applied to the specific virtual machine.

In another embodiment, membership selection patterns may include wildcard characters, such as "*". For example, a third policy group called "all VMs" may use a membership selection pattern "*" to identify all virtual machines within the primary cluster 102. The all VMs policy group may be used to identify every virtual machine in order to ensure replication of every virtual machine. The all VMs policy group may have a replication schedule that ensures daily replication of each virtual machine.

Referring back to FIG. 2, at block 220 the policy group process initiates replication of the first set of virtual machines based upon the replication schedule associated with the first policy group. In an embodiment, a replication scheduler process may be used to manage and execute snapshots and replication of snapshot for specific policy groups. The replication scheduler process is a program that may run on any one of the compute nodes 122-126 on the primary cluster 102. The replication scheduler process is configured to send snapshot requests to each of the compute nodes 122-126, where the snapshot request specifies the first policy group and the first set of virtual machines that are to be snapshotted.

Block 222, within block 220, depicts the step of the replication scheduler process sending a snapshot request for the first policy group. In an embodiment, the request for a snapshot from the replication scheduler process includes a particular point-in-time that each of the compute nodes 122-126 are to generate a point-in-time bookmark for the desired snapshot. As described, the point-in-time bookmark is used to mark a specific point within the data logs to identify the particular time window for the desired snapshots. By using the point-in-time bookmark the replication scheduler process may ensure that each of the snapshots of the first set of virtual machines are atomic based upon the particular point-in-time desired.

In an embodiment, the snapshot process executed on each compute node 122-126 is configured to run as a background process while the virtual machines are still active. The snapshot process is able to run in the background using the point-in-time bookmark to set the boundaries for the data that is to be included in the desired snapshots.

At step 224, the replication scheduler process initiates copying snapshot data and other identified data, such as OVFs and ISOs, of the first policy group to the secondary cluster 152. In an embodiment, the first policy group specifies a specific replication schedule that defines when to copy the snapshot data and other identified data to the secondary cluster 152. Details describing the process of copying the snapshot data and other identified data to the secondary cluster are described in the REPLICATION TASKS section herein.

Referring back to FIG. 2, at block 230 the policy group process initiates replication of the second set of virtual machines based upon the replication schedule associated with the second policy group. In an embodiment, the replication scheduler process executes snapshots and replication of snapshots for the second policy group. The replication scheduler process sends snapshot requests to each of the compute nodes 122-126.

Block 232, within block 230, depicts the step of the replication scheduler process sending the snapshot request for the second policy group. In an embodiment, the request for a snapshot from the replication scheduler process includes the particular point-in-time that each of the compute nodes 122-126 are to generate a point-in-time bookmark for the desired snapshot. In an embodiment, if a particular virtual machine belongs to two or more policy groups and two or more of the policy groups specify within the request for a snapshot the same point-in-time for the snapshot, then the receiving compute node may be configured to only execute a single snapshot for the particular virtual machine that belongs to the multiple policy groups.

At step 234, the replication scheduler process initiates copying snapshot data and other identified data of the second policy group to the secondary cluster 152. In an embodiment, the second policy group specifies a specific replication schedule that defines when to copy the snapshot data and other identified data to the secondary cluster 152. Details describing the process of copying the snapshot data and other identified data to the secondary cluster are described in the REPLICATION TASKS section herein.

In an embodiment, data specifying the membership selection pattern and replication schedule for each policy group may be modified and changes to the policy group may then be retroactively applied to the sets of virtual machines within each policy group. For example, if the membership selection pattern for the first policy group is modified from "mkt-res" to "mkt-res-prod" then the set of virtual machines assigned to the first policy group may be modified to reflect the new set of virtual machines that match the new pattern. Similarly, modifications to the replication schedule may modify when the replication scheduler process initiates snapshot requests, and requests to copy the snapshots from the primary cluster 102 to the secondary cluster 152.

Snap Store

Taking a snapshot of a policy group is unlike taking a snapshot of a file system in that the actual files that need to be included in the snapshot of a policy group may be located, within the file system hierarchy, at locations that have no relationship to the file system hierarchy. For example, at the time a particular snapshot of a particular policy group is taken, the various files that correspond to one virtual machine in the particular policy group may be located within a file system at locations L1, L2 and L3. At the time of that particular snapshot, the files that correspond to another virtual machine in that particular policy group may be located within the file system at locations L4, L5 and L6. Within the file system hierarchy, the locations L1, L2, L3, L4, L5 and L6 may not have any logical relationship relative to each other. Consequently, the file system hierarchy itself does not provide sufficient information to determine where the various files involved in the snapshot are located.

According to one embodiment, records are stored to indicate, on a per-snapshot-per-policy-group basis, the location of the files, within the file system, that belong to the snapshot. In one embodiment, those records further indicate, the virtual machines to which the files correspond. Those records are collectively referred to herein as a snap store. The snap store may be managed in various ways. For example, the snap store may be stored in a relational database system, a key-value store, or any other form of data retrieval system. The techniques described herein are not limited to any particular type of data retrieval mechanism for the information contained in the snap store. The following table is an example of records that may be stored in the snapshot store for two snapshots (SNP1, SNP2) of a policy group that includes two virtual machines (VM1, VM2):

| SNAPSHOT | POLICY GROUP | VIRTUAL MACHINE | FILE NAME | OBJECT TYPE | FILE LOCATION |
|---|---|---|---|---|---|
| SNP1 | PG1 | VM1 | F1 | TYPE1 | L1 |
| SNP1 | PG1 | VM1 | F2 | TYPE1 | L2 |
| SNP1 | PG1 | VM1 | F3 | TYPE2 | L3 |
| SNP1 | PG1 | VM2 | F4 | TYPE1 | L4 |
| SNP1 | PG1 | VM2 | F5 | TYPE1 | L5 |
| SNP1 | PG1 | VM2 | F6 | TYPE2 | L6 |
| SNP2 | PG1 | VM1 | F1 | TYPE1 | L1 |
| SNP2 | PG1 | VM1 | F3 | TYPE2 | L3 |
| SNP2 | PG1 | VM2 | F4 | TYPE1 | L4 |
| SNP2 | PG1 | VM2 | F5 | TYPE1 | L5 |
| SNP2 | PG1 | VM2 | F6 | TYPE2 | L7 |

In the example illustrated by the table, at the time the first snapshot of policy group PG1 was made, the policy group PG1 had two virtual machines VM1 and VM2. VM1 had three files F1, F2 and F3 located at locations L1, L2 and L3, respectively. VM2 had three files F4, F5, and F6 located at locations L4, L5 and L6, respectively. Within the snap store the file locations may be represented, for example, as paths through the file system hierarchy. In alternative embodiments, file locations may be identified in other ways. The techniques described herein are not limited to any particular way of indicating the stored locations of files.

At the time of the second snapshot of policy group PG1, the VMs that belonged to the policy group remained the same, but VM1 had only two files F1 and F3. In the second snapshot, VM2 still has the same three files, but the file F6 is now located at location L7, rather than L6.

For the purpose of explanation, the above-example illustrates records for only two snapshots of a single policy group. However, there is no limited to the number of policy groups that may be established, the number of VMs in each policy group, the number of snapshots, and how membership of policy groups may change between snapshots. For example, for a policy group that is based on a VM name pattern, the actual VMs that match that pattern may differ between snapshots.

The snap store may be queried in a variety of ways. For example, when a snapshot of a particular policy group is to be replicated and/or restored, the snap store may be queried based on the snapshot/policy-group to determine all files that need to be replicated, as well as their respective file locations. In addition, the snap store may be queried based on file name to determine all snapshots, policy groups, VMs and/or file locations to which the file corresponds. The snap store may be queried based on VM name to determine which policy groups the VM has been snapshotted in, as well as the identity of those snapshots, the files that belonged to the VM at the time of the snapshots, and the location of those files. The snap store may even be queried based on file location to determine the files have been snapshotted from that location, the VMs to which those files belonged, and the policy groups to which those VMs belonged.

Content Handles

As mentioned above, the techniques described herein may be used with a variety of types of file systems. In typical file systems, stored items are retrieved based on (a) the location at which the items are stored, and (b) a name or identifier of the items. For example, if a file named "foo.txt" is located in a directory named "c:\myfiles\text", then applications may use the pathname "c:\myfiles\text\foo.txt" as the access key to retrieve the file from the file system. Because conventional access keys are based on the location of the items being retrieved, the access keys change when the items are moved. In addition, each copy of an item has a different access key, because each copy is stored at a different location.

In contrast to conventional file systems, Content Addressable Storage (CAS) systems allow applications to retrieve items from storage based on a hash value that is generated from the content of the items. Because CAS systems perform storage-related operations on items based on the hash values generated for the items, and the hash values are based on the content of the items rather than where the items are stored, the applications that request the operations may do so without knowing the number or location of the stored copies of the items. For example, a CAS system may store multiple copies of an item X at locations A, B and C. An application that desires to retrieve item X would do so by sending to the CAS system a hash value that is based on the contents of item X. Based on that hash value, the CAS system would provide to the application a copy of item X retrieved from one of the locations A, B, and C. Thus, the application would obtain item X without knowing where item X was actually stored, how many copies of item X existed, or the specific location from which the retrieved copy was actually obtained.

Chunk storage systems may be implemented as CAS systems. For example, a chunk storage system may generate a hash value for a chunk by applying a cryptographic hash function (e.g. MD5, SHA-1 or SHA2) to the chunk. The chunk store may then store the chunk, and maintain an index that associates the hash value with the location at which the chunk is stored. When an application subsequently requests retrieval of the chunk, the application provides the hash value to the chunk storage system. The chunk storage system uses the index to locate the chunk associated with the hash value, and provides the chunk thus located to the requesting application.

In one embodiment, the files associated with VMs are stored in a content-addressable storage. In such an embodiment, "taking a snapshot" for a policy group may involve (a) determining which VMs belong to the policy group, and then (b) copying the content handles (a.k.a. "hash values" or "fingerprints") of the files that belong to the VMs that are members of the policy group to the snap store. Such content handles uniquely identify the corresponding files, and can be used to locate and access the files for replication operations.

Replication Tasks

Virtual machine data is copied from compute nodes within the primary cluster 102 to one or more target compute nodes 172 and 174 within the secondary cluster 152 using one or more parallel tasks executed on compute nodes within the primary cluster 102.

In an embodiment, the replication scheduler process, which runs on any one of the compute nodes 122-126, determines tasks for copying virtual machine data from compute nodes 122-126 to computes nodes 172 and 174 on the secondary cluster 152.

Figure 3:
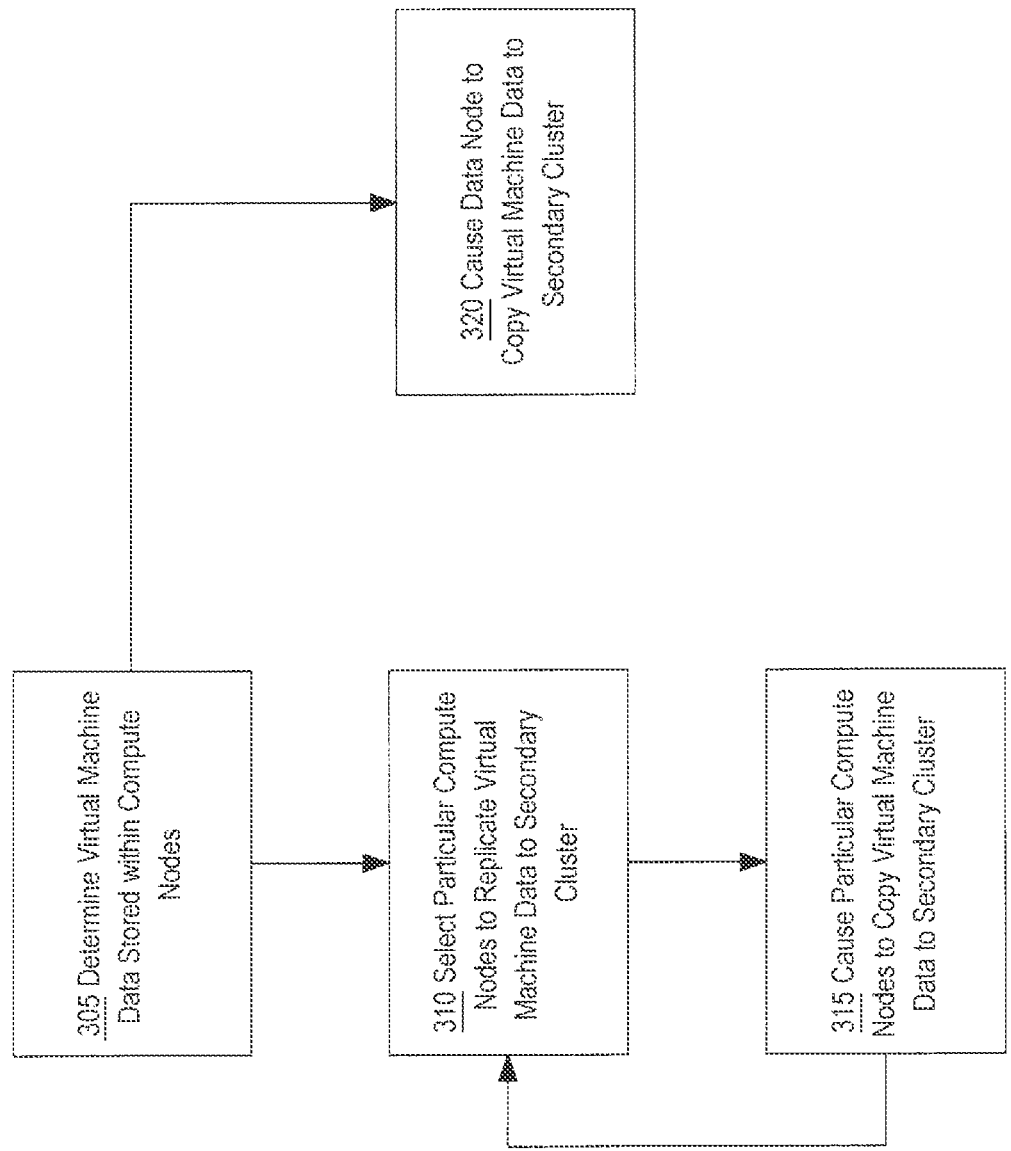
FIG. 3 depicts an example embodiment of a process for determining which virtual machine data is stored within caches of compute nodes, selecting and assigning copy tasks to compute nodes, and causing compute nodes to copy virtual machine data to a secondary cluster.

FIG. 3 depicts an example embodiment of the replication scheduler process determining virtual machine data, within caches of the compute nodes 122-126, selecting and assigning copy tasks to compute nodes 122-126, and causing compute nodes 122-126 to copy virtual machine data from the primary cluster 102 to the secondary cluster 152.

At block 305, the replication scheduler process determines the amount of virtual machine data stored within each of the caches on compute nodes 122-126. In an embodiment, for each of the compute nodes 122-126, the replication scheduler process determines a virtual machine footprint within the caches of compute nodes 122-126 for each virtual machine in a set of target virtual machines to be replicated. The set of target virtual machines refers to virtual machines that are scheduled for replication during the current replication task. For example, if the market research and policy group contains virtual machines 112, 114 and 118 then the task for replicating the virtual machines in the market research policy group would include virtual machines 112, 114 and 118.

In an embodiment, the replication scheduler process determines the virtual machine footprint for each of virtual machines 112, 114 and 118 on compute nodes 122-126. A virtual machine footprint is a measure of the amount of virtual machine data that is currently stored within the cache of a compute node. For example, virtual machine 112 is currently running on compute node 122 and therefore the cache for compute node 122 contains a significant portion of virtual machine data for virtual machine 112, such as virtual disk data, and current configuration settings for virtual machine 112. Compute nodes 124 and 126 may have previously been running virtual machine 112 and may have some amount of virtual machine data for virtual machine 112 still stored within their caches. However, it is likely that compute node 122, since it is currently running virtual machine 112, contains the largest virtual machine footprint of virtual machine 112.

In an embodiment, along with determining the sizes of virtual machine footprints in caches, the replication scheduler process may also determine a level of recency for virtual machine data stored within caches of compute nodes 122-126. In one embodiment, data nodes of the source primary cluster 102 and data nodes of the destination secondary cluster 152 may have identical virtual machine base data. In such cases, the replication task may involve generating incremental snapshot delta data for replication to the secondary cluster, the snapshot delta data being relative to the previously established identical base data.

By determining which compute node stores the more recent virtual machine data, the replication scheduler process may determine which compute node contains relevant virtual machine data corresponding to the latest snapshot delta that needs to be replicated to the secondary cluster 152.

In an embodiment, the replication scheduler process may determine virtual machine footprint properties from extended attributes associated with virtual machine data stored within data nodes 132 and 134 and compute nodes 122-126. Virtual machine extended attributes refer to metadata information associated with files and objects of virtual machine data. For example, metadata information may include execution duration and start/stop times for specific virtual machines on specific compute nodes.

In an embodiment, the replication scheduler process uses the virtual machine footprint properties to determine which compute node of compute nodes 122-126 should perform the tasks of copying specific virtual machine data to the secondary cluster 152.

At block 310 the replication scheduler process selects particular compute nodes to replicate virtual machine data to the secondary cluster 152. In an embodiment, the replication scheduler process assigns replication tasks for each of the virtual machines in the set of virtual machines to be replicated to compute nodes 122-126. In an embodiment, assignment of virtual machines to compute nodes is based upon the level of each virtual machine footprint. For example, compute node 122 may contain significantly more virtual machine data for virtual machine 112, such as recent snapshot data, stored within its cache. Based upon the virtual machine footprint stored within the cache of compute node 122, the replication scheduler process may assign the replication task for virtual machine 112 to compute node 122.

In other embodiments, assignment of virtual machines to compute nodes is based on the level of each virtual machine footprint and the recency of virtual machine data stored within caches on each of the compute nodes 122-126. For example, compute node 124 may contain a very large virtual machine footprint for virtual machine 112 however, based on the recency of data, compute node 122 may contain more recent virtual machine data than compute node 124. Therefore, the replication scheduler process may assign the replication task of virtual machine 112 to compute node 122.

In an embodiment, a replication task assigned to a particular compute node includes an indicator specifying which virtual machine data to copy and a target compute node destination within the secondary cluster 152. For example, the replication scheduler process assigns a replication task to compute node 122 to replicate virtual machine 112. The replication task may specify that the virtual machine data is to include a snapshot delta of virtual machine data from the most recent snapshot of virtual machine 112.

The replication task may also specify that the target is target compute node 172. In an embodiment, the replication scheduler process may be configured to analyze the target compute nodes 172 and 174 to determine which target compute node contains which virtual machine data. By ensuring that virtual machine data, including incremental snapshot deltas, are stored on the same target compute node, a particular target compute node may have a warm cache, for a particular virtual machine, that allows for efficient start up and run times for the particular virtual machine without the need to retrieve additional data stored within data nodes. For example, if compute node 172 contains incremental snapshot deltas of virtual machine 112, then it is more likely that compute node 172 is able to successfully start up a backup instance of virtual machine 112 then other target compute nodes based upon having virtual machine data for virtual machine 112 stored within the cache of compute node 172.

In an embodiment, collocation of incremental snapshot deltas for virtual machines and the overall available cache space for target compute nodes is used to determine the target compute node destination for replication tasks. For example, if target compute node 172 contains the majority of incremental snapshots for virtual machine 112 but, does not have enough space within its cache for new snapshots, then the replication scheduler process may assign a new replication task for virtual machine 112 to target compute node 174 based upon the available space in the cache of target compute node 174.

Referring back to FIG. 3, at block 315 the replication scheduler process causes each of the assigned compute nodes to copy the virtual machine data to the secondary cluster 152. In an embodiment, after assigning the replication tasks for each virtual machine in the set of virtual machines to compute nodes 122-126, each of the compute nodes that received replication tasks begin copying virtual machine data specified in the replication task to the specific target compute node specified in the replication task. Each replication task specifies which virtual machine data is to be copied by specifying a specific snapshot time that may be used to identify the specific snapshot files of the virtual machine to be copied. For example, the replication task received by compute node 122 may specify to copy the snapshot at timestamp 9:00 AM for virtual machine 112. Compute node 122 may then identify the specific snapshot based on the timestamp associated with the snapshot. The timestamp may represent the point-in-time bookmark used to create the snapshot or any other relevant identifiable time marker that is associated with the snapshots of virtual machines. In other embodiments, replication tasks may specify other specific identifiers, such as snapshot name, snapshot ID, snapshot UUID, or virtual machine identifiers, to identify which virtual machine snapshots are to be copied to the secondary cluster 152.

In an embodiment, each of the compute nodes may spawn a separate process or thread for each replication task received. For example, if compute node 122 receives two replication tasks to replicate virtual machine 112 and virtual machine 114, then compute node 122 may generate two separate processes or threads, one for each replication task received. By doing so, the number of replication tasks may be scaled based on the number of available compute nodes and the available resources available on each compute node. The primary cluster 102 may be able to increase aggregate replication throughput by either adding additional compute nodes to the primary cluster 102 or increasing the resources on each compute node within the primary cluster 102.

In an embodiment, if a particular compute node does not have the necessary virtual machine data to complete replication of a particular virtual machine, then the particular compute node may request additional virtual machine data from either other compute nodes within the primary cluster 102 or from the data nodes within the primary cluster 102. For example, if compute node 122 receives a request to replicate virtual machine data for virtual machine 112 but does not have all the necessary snapshot files for virtual disk data, then compute node 122 may request the necessary virtual disk data from either compute node 124, compute node 126, data node 132, or data node 134. Determining where to request the data may be based on virtual machine footprint data and other metadata. In an embodiment, compute node 122 may access the virtual machine footprint data and other metadata to determine whether either compute node 124 or compute node 126 has the necessary virtual disk data for virtual machine 112. If either compute node 124 or compute node 126 has the necessary data, then compute node 122 sends a request directly to compute node 124 or compute node 126 to replicate the virtual disk data for virtual machine 112 to the target compute node.

If compute node 122 determines that the necessary virtual disk data for virtual machine 112 is not contained within either compute node 124 or compute node 126, then compute node 122 may send a request to data nodes 132 and 134 to locate the necessary virtual disk data and copy the data directly to the specified target compute node. In another embodiment, compute node 122 may fetch the necessary virtual disk data from data node 132 or data node 134 as well as request data node 132 or data node 134 to copy the data directly to the specified target compute node. By doing so, compute node 122 may ensure that future snapshots and replication tasks of virtual machine 112 may be completed by compute node 122 without having to fetch or request additional transfers of data.

Compute nodes 122-126 are configured to be fungible resources with respect to replication tasks. If a particular compute node crashes or otherwise goes offline, the replication scheduler process is configured to reassign replication tasks to other compute nodes. Referring back to FIG. 3, the arrow from block 315 back to block 310 represents the scenario of a compute node, which received one or more replication tasks, going offline. In an embodiment, the replication scheduler process, at block 310 reassigns the pending replication tasks to other compute nodes based on their virtual machine data footprints with respect to the virtual machines that need replication. For example, if compute node 126 received a request to replicate virtual machine 118 but went offline or crashed, then the replication scheduler process may reassign the replication task for virtual machine 118 to either compute node 122 or compute node 124. The reassignment is based on which of compute nodes 122 or 124 have a larger and more recent virtual machine data footprint for virtual machine 118.

In an embodiment, the replication scheduler process is configured to monitor the state of replication tasks assigned to compute node in order to determine whether a particular compute node is still online. Other embodiments of replication task reassignment may be based whether a particular replication task is significantly delayed. For example, if compute node 122 is still online but the replication task for replicating virtual machine 114 is delayed because of other running processes on compute node 122, then the replication scheduler process may reassign the replication task to simply balance the replication load across available compute nodes.

Bulk Replication

In some instances, it is more efficient to bypass compute node caches and copy virtual machine data stored on a data node directly to the secondary cluster 152. Referring back to FIG. 3, at block 305 the replication scheduler process may determine based on the amount of virtual machine data stored within compute nodes 122-126 that it is more efficient to copy data from data nodes 132 and 134, using large bulk reads from disk, to the secondary cluster 152. In an embodiment, the replication scheduler process may determine that the amount of virtual machine data, for a particular virtual machine, stored within caches of compute nodes 122-126 is not significantly high enough to warrant a compute node replication task that replicates from compute node caches. If caches within compute nodes 122-126 do not contain virtual machine data for a particular virtual machine, then in order for a particular compute node to replicate the particular virtual machine, the particular compute node would first need to retrieve and store the particular virtual machine data within the cache of the particular compute node. After retrieving and storing the particular virtual machine data, the particular compute node may begin replication of the particular virtual machine data to the secondary cluster 152. This process of retrieving the particular virtual machine data, storing the particular virtual machine data, and then replicating the data to the secondary cluster 152 is likely inefficient and uses unnecessary computing resources. It might be more efficient to instead read large sequential blocks from data nodes and replicate them to the target either directly or via source compute nodes.

The replication scheduler process may use a configured cache hit rate threshold to determine whether large bulk reads from disk are more efficient than a compute node replication task. For example, if the cache hit rate for each of the compute nodes 122-126 for virtual machine 118 is below 5%, meaning that 95% of the time a compute node would have to access data from the data node 132, then the replication scheduler process may conclude that a compute node replication task is not desirable.

Determining whether to switch to large bulk reads from disk may further rely on determining the fragmentation level of the disks on data node 132 for the desired virtual machine 118. If the fragmentation level of the disk on data node 132 to too high, then it may still be more efficient to schedule a replication task on a compute node rather than large bulk reads from highly fragmented disks. In an embodiment, if the replication scheduler process determines that the cache hit rate is below a specific threshold for a virtual machine and the disk fragmentation level for the virtual machine stored on disk is below a configured fragmentation level, then the replication scheduler process schedules replication of the virtual machine by large bulk reads from disk. For example, if the configured cache hit rate threshold is 5% and the fragmentation threshold is 10%, then if for virtual machine 118 the replication scheduler process determines that the cache hit rate on compute nodes 122-126 is below 5% and the fragmentation level of virtual machine 118 stored on data node 132 is below the 10% threshold, then the replication scheduler process schedules large bulk reads from data node 132.

Referring back to FIG. 3, if the replication scheduler process determines that large bulk reads from disk are more efficient, then the replication scheduler process proceeds to block 320. At block 320 the data node 132 initiates a bulk read from disk to copy the virtual machine data 118 from the data node 132 to the secondary cluster 152. A bulk read from disk to copy virtual machine data includes a sequential scan of disks on data node 132 and copying the scanned data to either a target compute node 172 or 174 or copying the scanned data to either data node 182 or 184. Alternatively, a source compute node may perform this sequential scan by reading data from source data nodes; the source compute node will then send the data to the destination compute node.

Distributed Virtual Array

Figure 4:
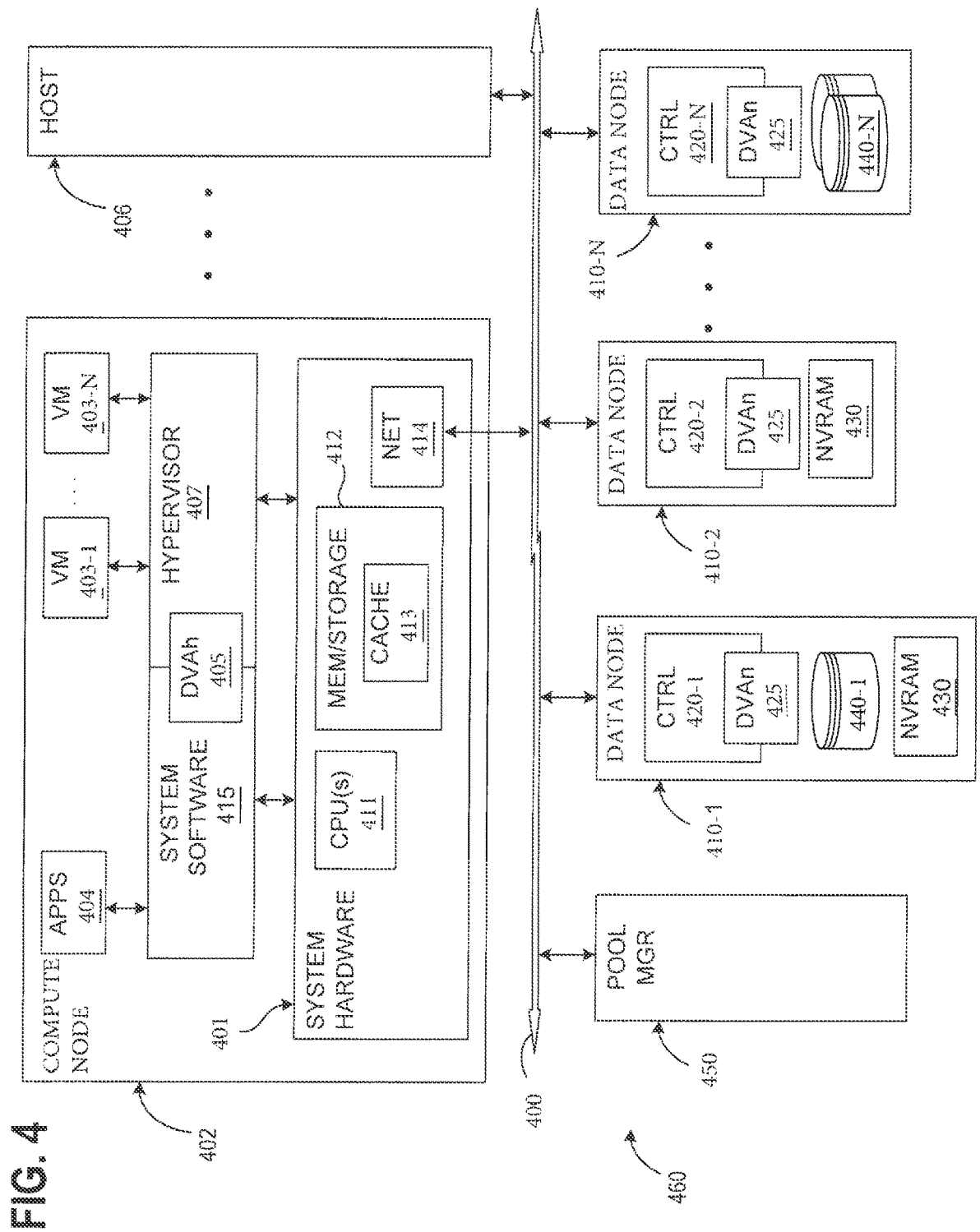
FIG. 4 depicts an embodiment of a Distributed Virtual Array (DVA) system.

FIG. 4 shows a general embodiment of a distributed virtual array (DVA) and illustrates the relationship between two main physical "sides" of the DVA: any number (including one) of compute nodes 402, for example, servers, and a storage pool 460, which includes data nodes 410-1, 410-2, . . . , 410-N (collectively, "410"), which from the perspective of the compute nodes, may form a single yet distributed storage system. In an embodiment, compute nodes 402 may also represent compute nodes 122-126 and target compute nodes 172 and 174 of FIG. 1. Entities within the compute nodes 402 write data that is first stored in non-volatile memory (shown as NVRAM 430) and ultimately stored in persistent storage devices 440-1, . . . , 440-N (collectively, "440") located in the nodes.

The reading and writing entities may be of any type, including virtual machines 403 (shown separately as "VM"s 403-1, . . . , 403-N) or more general, non-virtualized processes such as user-level applications 404. Software and hardware entities that need to read and/or write data are referred to here as "clients".

Each compute node includes system hardware 401, including one or more processors (CPUs) 411, and some device(s) 412 for non-persistent, volatile and/or persistent, non-volatile, non-transitory storage of data and/or code that may execute on the CPU(s). Traditionally, there is a relatively clear technical distinction between "memory" and "storage", since the former has typically comprised fast, volatile, solid-state devices, whereas the latter have generally comprised slower, non-volatile, mechanical or opto-mechanical devices. With the wide-spread use of modern technologies for bulk, persistent storage, however, this distinction is becoming increasingly less clear. For example, many modern servers use various solid-state storage devices (SSDs) such as "server flash" to increase throughput and speed, which is commonly measured in terms of IOPS (Input/Output Operations Per Second), especially for non-contiguous storage locations. Emerging technologies such as phase-change memory (PRAM) are further blurring the distinction. No specific type of compute node-side storage or memory technology is required to implement the embodiments described here, and it is not necessary for every compute node to employ the same storage technology.

The hardware 401 will include other conventional mechanisms such as a network connection device 414 for transfer of data between the various components of the system over one or more network(s) 400, which may be any known public or proprietary local or wide-area network such as the Internet, an internal enterprise network, etc. The only requirement is that, whatever network(s) is/are used, all clients are able to access the storage nodes (see below) they need to access. "The" network 400 is therefore to be read as the collection of whichever networks are implemented, along with any necessary switching or other communications devices if data needs to pass between different networks.

Each compute node will also include conventional system software 415 such as, depending on the implementation, an operating system (OS), device drivers, etc. In the illustrated configuration, one of the compute nodes 402 is shown as supporting a virtualization platform, which will typically include some form of hypervisor 407 or similar interface layer between the system hardware 401 and (in the illustrated embodiment) at least one virtual machine (VM) 403-1, . . . , 403-N. As is well known, VM is a software abstraction of an actual physical computer system.

The VMs are shown in FIG. 4 within the compute node merely for simplicity—in most implementations, a virtual machine is a "guest" that is running on the hypervisor/hardware compute node. In some virtualized systems, a "virtual machine monitor" is included as an interface to underlying software layers, such as the hypervisor or a compute node OS. Many hypervisors, such as the VMware ESX® Server family of products of VMware®, Inc., run directly on "bare metal", that is, directly on the system hardware 401, with no need for interaction with a compute node OS. In other virtualization platforms, the hypervisor may run on or at the same level as the compute node OS, which supports and performs some operations upon calls from the hypervisor. The various embodiments of the invention described here are not dependent on any particular virtualization architecture, whether for the VMs, the hypervisor(s) or other virtualization layers. Indeed, VMs are not presupposed at all; rather, all that is assumed is some system software layer that processes data storage read/write requests from software and hardware entities ("clients"). A "compute node" is thus any platform on which processes (of which VMs are a special case) run that may wish to write data to and/or read data from the distributed storage arrangement described below.

Although the various data nodes 410 in the storage pool 460 are shown as distinct units and may be different physical servers, they may be considered to lie within a single logical boundary for purposes of addressing. The logical, conceptual boundary of the addressable storage pool may, however, also include storage components and processes that extend beyond the illustrated set of physical data nodes 410-1, 410-2, . . . , 410-N.

Depending on the desired DVA features, a Pool Manager 450 may also be included to handle some distribution and control functions for the nodes 410, to maintain administrative and other data common to the nodes 410, etc. Such a Pool Manager may run within one or more of the storage nodes, within one or more of the compute nodes, or in a separate computing system attached to the same network. Although they may also be implemented as independent entities, the Pool Manager may also include other managerial components, such as for managing a file name space for files (such as virtual disks) stored within the pool, for cluster management, and for other node-management functions.

More generally, the nodes can be implemented using any form of computer that communicates with at least one disk over any form of bus or network connection. Indeed, a node could itself even be an entity that writes data to the storage pool.

Each node contains one or more storage controllers 420-1, 420-2, . . . , 420-N (collectively, 420) each of which comprises conventional processing circuitry to control one or more disks, flash or other SSD devices or other devices comprising the persistent storage devices 440 (which comprises more than one physical device). The controller also contains the circuitry necessary to connect to the network 400. In some embodiments, the controller may be integrated with the storage device in single composite module. As with the compute node 402, the various software components used within the nodes of the storage pool 460 will be loaded and/or stored in any conventional method so as to be executable on the processor(s) on each hardware platform within the pool; these media and processor(s) are not illustrated separately in the figures for the sake of simplicity—skilled programmers will of course know these will be present. So far, the system components described are also found in many prior art systems.

In the preferred embodiment, at least one of the controllers 420 also includes, or is able to access, some non-volatile memory 430 to receive and persistently store newly written data with very low latency. In some systems, the NVRAM may be on a special card in a PCIe slot. In some implementations, the controller may have a battery backup; on power failure, the controller will then have enough time to copy a portion of system memory to a flash drive. In this case, the NVRAM 430 need not be a separate physical component but may instead a logical portion of the general purpose RAM that will be within the controller for other, standard purposes. In some systems, the NVRAM may just be a low-latency SSD. Not all implementations of embodiments of the invention require nodes to have both disks and NVRAM; rather, any given node may be configured to have or at least be able to access only one of these two types of persistent storage devices. Thus, as FIG. 4 illustrates, it is possible to implement the system such that one or more nodes may have both persistent storage device(s) and non-volatile memory (node 410-1, for example), while one or more other nodes may not include the persistent storage device (node 410-2, for example), and still other node(s) may not have a non-volatile memory component 430 at all. As FIG. 4 also illustrates with node 410-N, it is possible to one or more nodes to have more than one persistent storage device (740-N). Moreover, in some embodiments, the NVRAM may be in a compute node.

In the preferred embodiment, the compute node is able to write data over the network specifically to the NVRAM in a storage node or compute node, distinct from writing to a persistent storage device, and may also give commands to remove data from said NVRAM. This in contrast to the configuration in traditional storage systems in which the NVRAM is a transparent buffer for data on its way to a persistent storage device.

As mentioned above, two dominant storage philosophies fall near different ends of the trade-off spectrum: In hyper-converged systems, substantially the entire storage and computation burden is concentrated within interdependent compute nodes, whereas in other systems, most of the computational load is placed on the remote storage units themselves and the compute nodes do not depend directly on each other. Embodiments of the invention employ a different approach, in which the usually greater computational resources of compute nodes are used for many storage-related functions, but used in a way that does not require significant inter-compute node communication and coordination, and in which the main storage capability remains primarily in the remote nodes where any compute node can access it without going through another compute node.

To this end, the compute nodes and the nodes include respective DVA components—a DVAh 405 module at the system software level, and DVAn 425 in the nodes. As FIG. 4 illustrates by overlapping, the DVAh 405 may be implemented as part of the system software 415, as part of the controlling software (such as the hypervisor 407) of the virtualization platform, or with cooperating components in both. Options include configuring the DVAh component as a driver within the system software 415, or within the hypervisor 407, with call-outs as needed to the compute node operating system (system software). It would also be possible to configure the DVAh 405 component within a different user- or system-level process, or even within a "helper" VM. Regardless of the configuration of the DVAh and DVAn, they will generally be implemented as corresponding bodies of processor-executable code that is stored in non-transitory storage and loaded into memory for execution by the compute node CPU(s) 411.

Similarly, the DVAn 425 components in the nodes may also be implemented as software running on the respective storage controllers 420, or as software modules separate from but coordinating with the storage controllers, and will also be implemented as corresponding bodies of processor-executable code that stored in non-transitory storage and loaded into memory for execution by the processor(s) in the nodes 410.

In an embodiment, storage controller 420 manages data encryption by distributing encryption keys to the DVAh 405 located on compute nodes. In order to maintain security, encryption keys used by compute nodes may be rotated periodically. The storage controller 420 maintains an encryption table that contains multiple encryption keys that may be used by different compute nodes at different times for data encryption.

A cache 413 is preferably included in at least one compute node, preferably as part of the memory/storage component(s) 412. The cache may be implemented using any conventional, sufficiently fast technology, such as by using one or more Flash memory device(s), phase-change random access memory (PRAM), a portion of the main system memory, etc. The cache may also be implemented as a separately packaged, Solid-State Disk (SSD), a circuit card plugged into a bus within the server, as a module on the server motherboard, etc.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
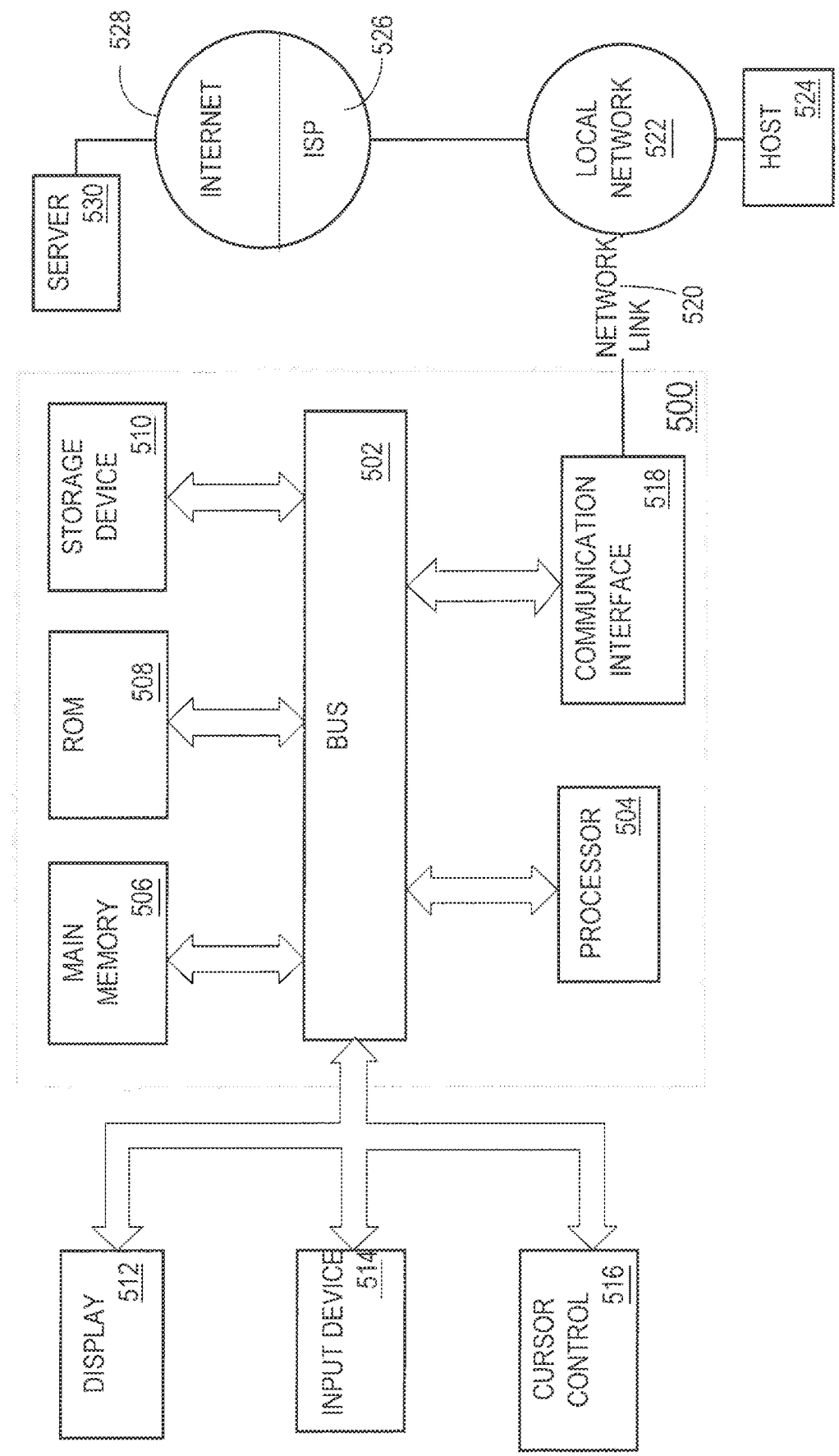
FIG. 5 is a block diagram that depicts an example computer system upon which embodiments may be implemented.

For example, FIG. 5 is a block diagram that illustrates a computer system 500 upon which an embodiment may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 930 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   establishing a plurality of policy groups, wherein each policy group of the plurality of policy groups has:
      a snapshot-generation schedule that defines when to generate snapshots of object data of objects that belong to the policy group; and
      a membership-selection pattern;
   wherein the plurality of policy groups includes:
      a first policy group with a first snapshot-generation schedule and a first membership-selection pattern, and
      a second policy group with a second snapshot-generation schedule and a second membership-selection pattern, and
   wherein the first membership-selection pattern is different than the second membership-selection pattern;
   based on the first snapshot-generation schedule, determining a first time to create a first snapshot for the first policy group;
   at the first time, creating the first snapshot for the first policy group by:
      determining that a first set of objects, that are running in a primary cluster, qualify as members of the first policy group based on a property of the objects matching the first membership-selection pattern;
      adding first records to a snap store, wherein the first records include:
         data that identifies the first snapshot as the snapshot associated with the first records;
         data that identifies the first set of objects;
         data that identifies files that belong to the first set of objects at the first time;
         data that identifies where the files that belong to the first set of objects are located, within a file system, at the first time;
   based on the second snapshot-generation schedule, determining a second time to create a second snapshot for the second policy group;
   at the second time, creating the second snapshot for the second policy group by:
      determining that a second set of objects, that are running in the primary cluster, qualify as members of the second policy group based on a property of the objects matching the second membership-selection pattern;
      adding second records to the snap store, wherein the second records include:
         data that identifies the second snapshot as the snapshot associated with the second records;
         data that identifies the second set of objects;
         data that identifies files that belong to the second set of objects at the second time;
         data that identifies where the files that belong to the second set of objects are located, within a file system, at the second time.

2. The method of claim 1 wherein the first set of objects is a first set of virtual machines and the second set of objects is a second set of virtual machines.

3. The method of claim 2, wherein:
   each policy group of the plurality of policy groups further includes a snapshot-copy schedule that defines when to copy virtual machine data that corresponds to the policy group to a target destination; and
   the method further comprises:
      based on the snapshot-copy schedule, determining a third time at which to copy virtual machine data that corresponds to the first policy group;
      based on the first records in the snap store, determining a particular set of files to copy to the target destination in a secondary cluster to replicate virtual machines that belong to the first policy group; and
      at the third time, copying the particular set of files to the target destination in the secondary cluster.

4. The method of claim 2 further comprising querying the snap store based on an identifier of a particular VM to identify snapshots to which the particular VM belongs.

5. The method of claim 4 wherein:
   the first records indicate that the particular VM belongs to the first snapshot of the first policy group;
   the second records indicate that the particular VM belongs to the second snapshot of the second policy group; and
   the method further comprises generating a query response that indicates that the particular VM belongs to both the first snapshot and the second snapshot.

6. The method of claim 2 further comprising querying the snap store to based on an identifier of a particular VM to identify policy groups to which the particular VM belongs.

7. The method of claim 2 wherein:
   files associated with the first set of virtual machines are stored in content addressable storage; and
   content handles copied to the snap store to:
      identify the files associated with the first set of virtual machines; and
      identify where the files associated with the first set of virtual machines are located within the content addressable storage.

8. A method comprising:
   establishing a plurality of policy groups for grouping virtual machines, wherein each policy group of the plurality of policy groups is configured to provide a distinct replication schedule that defines when each of a plurality of virtual machines in the policy group is to be replicated, and wherein each policy group has a corresponding distinct membership-selection pattern used to identify the plurality of virtual machines that belong to the policy group;
   wherein the distinct membership-selection pattern of a particular policy group includes attribute-based criteria based on particular metadata associated with virtual machines;
   determining membership of each policy group based on the membership selection-pattern of the corresponding policy group, wherein determining membership for each policy group comprises;
   determining that a particular set of virtual machines, that are running in a primary cluster, have one or more metadata properties that satisfy the attribute-based criteria specified in the membership-selection pattern of the particular policy group; and
   replicating virtual machine data of a first set of virtual machines to a secondary cluster based on a first replication schedule associated with the a first policy group and replicating virtual machine data of a second set of virtual machines to the secondary cluster based on a second replication schedule, distinct from the first replication policy, and associated with the second policy group.

9. The method of claim 8, wherein the attribute-based criteria included in the membership-selection pattern of the particular policy group includes an explicit enumeration of virtual machines that belong to the particular policy group.

10. The method of claim 8, wherein the attribute-based criteria included in the membership-selection pattern of the particular policy group specifies at least one of:
   a tag that must have been assigned to a virtual machine for the virtual machine to qualify as a member of the particular policy group;
   a security group to which a virtual machine must have been assigned for the virtual machine to qualify as a member of the particular policy group; or
   an owner that must own a virtual machine for the virtual machine to qualify as a member of the particular policy group.

11. The method of claim 8, wherein the attribute-based criteria included in the membership-selection pattern of the particular policy group specifies at least one of:
   a host-cluster to which a virtual machine must be associated for the virtual machine to qualify as a member of the particular policy group;
   data change rate criteria that must be satisfied by a virtual machine for the virtual machine to qualify as a member of the particular policy group; or
   virtual machine size criteria that must be satisfied by a virtual machine for the virtual machine to qualify as a member of the particular policy group.

12. The method of claim 8, wherein the attribute-based criteria included in the membership-selection pattern of the particular policy group specifies at least one of:
   a number or character of virtual disks that must be attached to a virtual machine for the virtual machine to qualify as a member of the particular policy group; or
   a file system type used to format one or more disks associated with a virtual machine for the virtual machine to qualify as a member of the particular policy group.

13. The method of claim 8, wherein the attribute-based criteria included in the membership-selection pattern of the particular policy group specifies specific software that must be residing in a virtual machine for the virtual machine to qualify as a member of the particular policy group.

14. The method of claim 8, wherein the attribute-based criteria included in the membership-selection pattern of the particular policy group specifies an IP address or subnet that must be associated with a virtual machine for the virtual machine to qualify as a member of the particular policy group.

15. The method of claim 8, wherein:
   a particular virtual machine has a particular network address;
   a Domain Name System associates a particular name with the particular network address; and
   the membership-selection pattern of the particular policy group specifies name criteria that must be satisfied by the particular name for the particular virtual machine to qualify as a member of the particular policy group.

16. The method of claim 8 wherein the membership-selection pattern further includes name-based criteria that must be satisfied by a name of a virtual machine for the virtual machine to qualify as a member of the particular policy group.

17. A method comprising:
   automatically establishing a plurality of policy groups, wherein each policy group of the plurality of policy groups has a corresponding distinct membership-selection pattern;
   wherein automatically establishing each policy group comprises:
      discovering a set of metadata properties that are common to each virtual machine in a particular group of virtual machines;
      generating a membership-selection pattern for the particular policy group based on the discovered set of metadata properties that are common to each virtual machine in the particular group of virtual machines;
   assigning a particular set of virtual machines as members of each policy group based on the membership selection-pattern of the respective policy groups; and
   replicating virtual machine data of each particular set of virtual machines to a secondary cluster based on a respective replication schedule associated with the corresponding policy group of the set of virtual machines, wherein replicating virtual machine data for a first policy group comprises generating a snapshot for the first policy group according to a replication schedule specified for the first policy group, wherein generating a snapshot for the first policy group includes accessing data records indicating, on a per-snapshot-per-policy-group basis, the location of files within the file system that belong to the snapshot for the first policy group.

18. The method of claim 17, wherein discovering the set of metadata properties that are common to each virtual machine in a particular group of virtual machines comprises:
   applying clique detection approaches to metadata properties that may be associated with a virtual machine; and
   creating policy groups based on virtual machines that correspond to detected cliques.

* * * * *